United States Patent [19]
Yoshida

[11] Patent Number: 4,823,375
[45] Date of Patent: Apr. 18, 1989

[54] DATA COMMUNICATION APPARATUS CUPABLE OF DISABLING AN OUTPUT COMPONENT WHEN OUTPUT OF A TYPE PROVIDED BY THAT COMPONENT IS UNNECESSARY

[75] Inventor: Takehiro Yoshida, Tokyo, Japan
[73] Assignee: Canon Kabushiki Kaisha, Tokyo, Japan
[21] Appl. No.: 32,369
[22] Filed: Mar. 31, 1987
[30] Foreign Application Priority Data Apr. 3, 1986 [JP] Japan ................................ 61-077032

[51] Int. Cl.4 ........................................... H04M 11/00
[52] U.S. Cl. ..................................... 379/100; 379/93; 375/5
[58] Field of Search ....................... 379/94, 96, 97, 98, 379/100, 93; 358/257; 375/5

[56] References Cited

U.S. PATENT DOCUMENTS

| 4,055,729 | 10/1977 | Vandling | 358/257 X |
| 4,113,992 | 9/1978 | Gorham et al. | 358/257 X |
| 4,288,662 | 9/1981 | Fahrenschon et al. | 379/94 |
| 4,353,097 | 10/1982 | Takeda et al. | 358/287 |
| 4,367,374 | 1/1983 | Serrano | 379/442 |
| 4,532,377 | 7/1985 | Zink | 379/94 |
| 4,578,537 | 3/1986 | Faggin et al. | 379/100 X |

FOREIGN PATENT DOCUMENTS

| 0188865 | 7/1986 | European Pat. Off. | 379/100 |
| 0134552 | 7/1985 | Japan | 379/100 |
| 0148268 | 8/1985 | Japan | 379/100 |
| 0180363 | 9/1985 | Japan | 379/100 |
| 62-29265 | 2/1987 | Japan | 379/100 |
| 2160072 | 12/1985 | United Kingdom | 379/100 |

OTHER PUBLICATIONS

Witt, "Switchbox For Voice/Data Communication", IBM Tech. Disclosure Bulletin, vol. 14, No. 5, Oct. 1971.

Primary Examiner—Keith E. George
Attorney, Agent, or Firm—Fitzpatrick, Cella, Harper & Scinto

[57] ABSTRACT

A data communication apparatus has a data communication unit for performing a data communication; a speech unit for performing communication; an output unit for outputting a signal received from a partner station; and a control unit for judging if there is a possibility of communication by the partner and controlling the output unit based on the judgment result.

6 Claims, 2 Drawing Sheets

DATA COMMUNICATION APPARATUS CUPABLE OF DISABLING AN OUTPUT COMPONENT WHEN OUTPUT OF A TYPE PROVIDED BY THAT COMPONENT IS UNNECESSARY

BACKGROUND OF THE INVENTION

1. Field of the Invention

The present invention relates to a data communication apparatus having a function of monitoring information or a communication line.

2. Related Background Art

As an example of apparatus of this type, there is known a facsimile apparatus having a function of monitoring information on a line by outputting from a loudspeaker audible sounds corresponding to signals on the line.

Every time a signal from a sending party is received by the facsimile apparatus, the monitor (loudspeaker) is turned one and kept in this condition until a significant signal (e.g., preamble signal, tonal signal or phase signal (PHS)) is detected.

The object of monitoring is to notify the operator at the facsimile apparatus of the fact that an operator at a sending party is calling via a telephone set.

In sending and receiving data over a dedicated facsimile communication line, an operator is not requested to communicate by speech in any case. However, the apparatus monitors the line also in this case.

As a result, procedure signals for facsimile communication and image signals are converted into audible sounds and outputted from a loudspeaker, resulting in a problem of a very noisy environment.

SUMMARY OF THE INVENTION

An object of the present invention is to improve a data communication apparatus.

Another object of the present invention is to eliminate the above problem.

A further object of the present invention is to avoid unnecessary monitor operation.

According to one aspect of the present invention, a data communication apparatus does not monitor a network line unless an operator is required to respond.

According to another aspect of the invention a data communication apparatus does not monitor a dedicated data communication network if used is used.

Other objects, features and advantages of the present invention will become apparent from the following detailed description of the preferred embodiment, taken in conjunction with the accompanying drawings.

DETAILED DESCRIPTION OF THE PREFERRED EMBODIMENT

The preferred embodiment of this invention will be described in detail with reference to the accompanying drawings.

Figure 1:
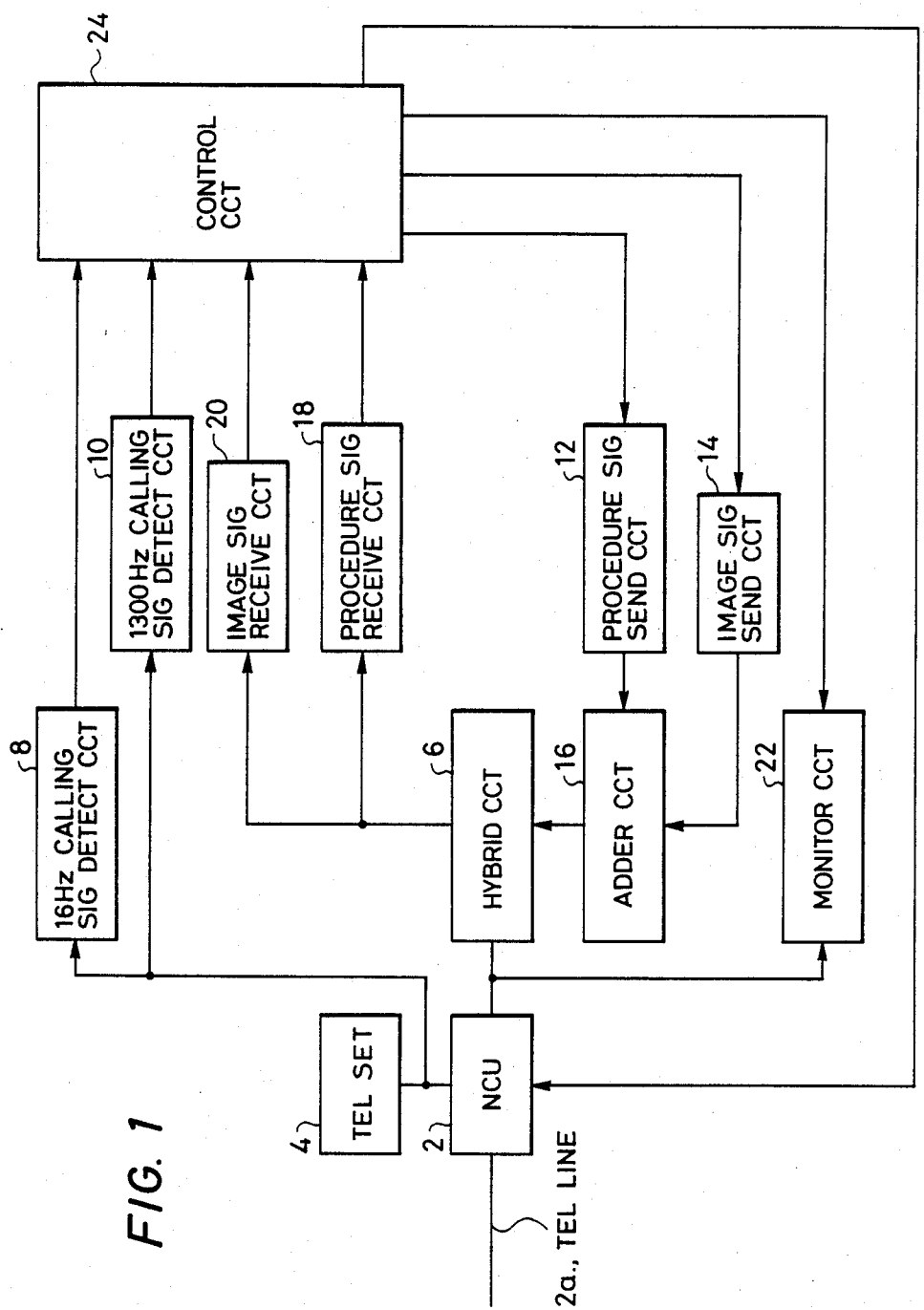
FIG. 1 is a block diagram showing the construction of a data communication apparatus according to an embodiment of this invention.

FIG. 1 is a block diagram illustrating the preferred embodiment of this invention.

A network control unit (NCU) 2 is connected to a terminal of a telephone line 2a to utilize the telephone network for data communication and the like. NCU 2 conncts the telephone line 2a to a telephone set 4 or to a data communication device, or to hold a loop.

A signal from a control circuit is inputted to NCU 2 24. If the signal level is "0", the telephone line 2a is connected to the telephone set 4, whereas if the signal level is "1", the telephone line 2a is connected to a hybrid circuit, which can serve. Ordinarily, the telephone line 2a is connected to the telephone set 4.

The hybrid circuit 6 separates signals to be sent and received signals. Particularly, signals to be sent are delivered to the telephone line 2a via NCU 2, while received signals from NCU2 and the hybrid circuit 6 are delivered to a procedure signal receiving circuit 18 and an image signal receiving circuit 20.

A 16 Hz calling signal detection circuit 8 generates a pulse upon detecting a 16 Hz calling signal from the telephone line 2a. A 1300 Hz calling signal detection circuit 10 generates a pulse upon detecting a 1300 Hz calling signal from a dedicated facsimile communication line.

A signal from the control circuit is input to a procedure signal sending circuit 12, which modulates it in accordance with CCITT Recommendation V21 and outputs a tonal signal and a procedure signal to an adder circuit 16.

An image signal sending circuit 14 detects command signals from the control circuit 24 and outputs to the adder circuit 16 an image signal, a PHS signal and a training signal at respective times instructed by the contrl circuit 24. An image signal to be sent is read by means of a reader (not shown) and thereafter, the image signal is encoded for G3 transmission and the encoded data is modulated. A modified Huffman (MH) method, a modified READ (MR) method, a modified-modified READ (MMR) method and the like may be applied the encoding process.

The procedure signal receiving circuit 18 outputs the V21-modulated data and a signal indicating discrimination of a received tonal signal.

An image signal receiving circuit 20 receives, at various times, an image signal, a PHS signal and a training signal. A received image signal is demodulated and decoded, in the case of G3 transmission, and the decoded data is subsequently recorded. Signals indicating discrimination of a received PHS signal and a training signal are outputted therefrom.

A monitor circuit 22, constructed of a loudspeaker and other necessary circuit elements, is turned on when a signal from the control circuit 24 is at level "1", thereby to radiate audible sounds corresponding to signals from NCU 2. On the other hand, the monitor circuit 22 is turned off when the signal level is "0", in which case it does not radiate audible sounds corresponding to signals from NCU 2.

When a 1300 Hz calling signal is detected on a dedicated facsimile communication line, the control circuit 24 does not turn the monitor on. In other cases, when the telephone line 2a is connected to the facsimile side, the control circuit 24 does turn the monitor on. The control circuit 24 also turns the monitor off when a significant signal (such a a preamble signal, Group Command Signals (GC1 and GC2), Procedure Interrupt Signal (PIS) or PHS signal) is received.

In other words, the control circuit 24 does not oper-ate the monitor when there is no possibility of an operator response, but makes the monitor turn on when there is a possibility of an operator response, and turns the monitor off when a significant signal is received. The control circuit 24 is constructed of microcomputer peripheral devices such as a microcomputer, ROM and RAM.

Next, the illustrated operation of the embodiment will be described.

Figure 2:
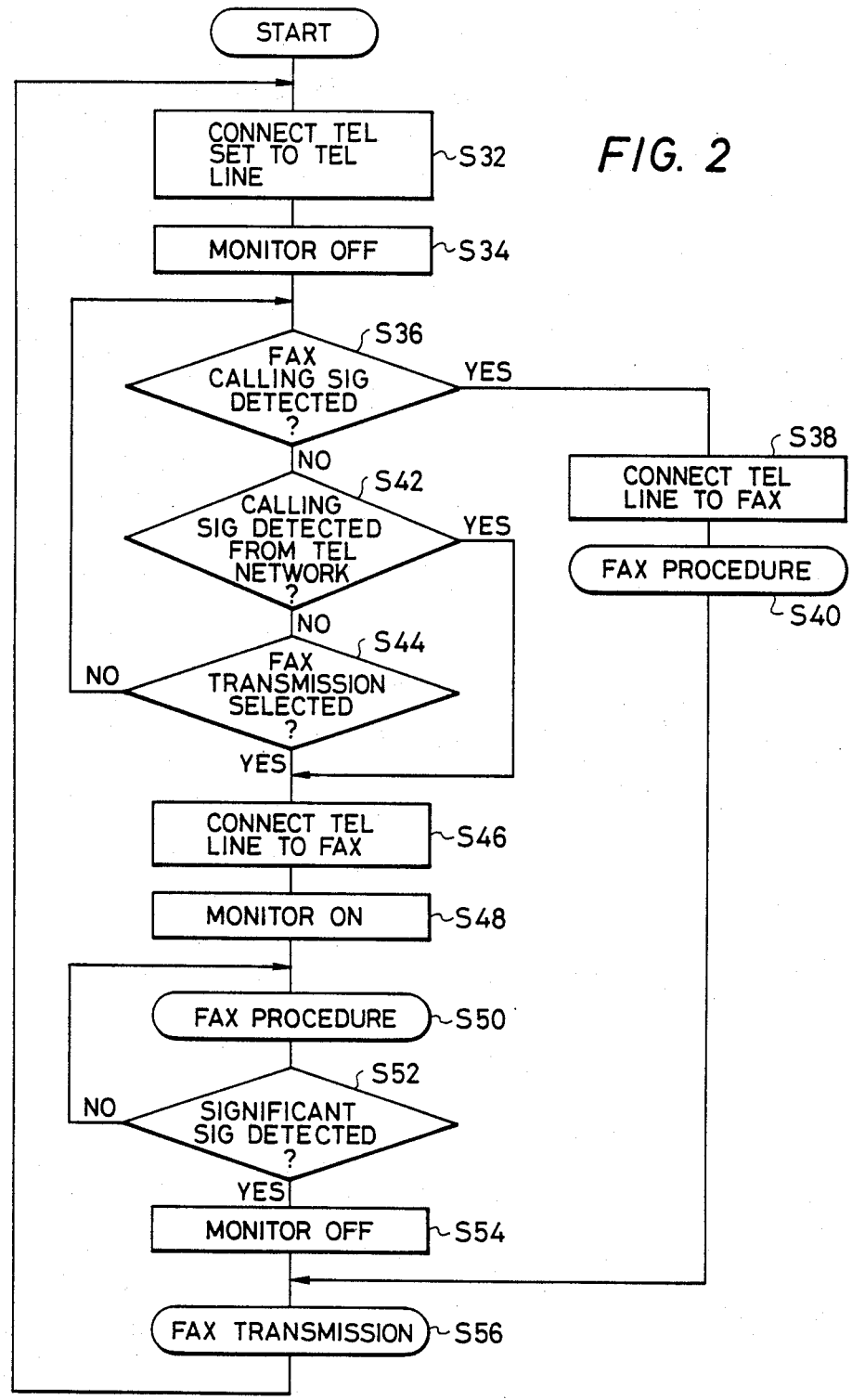
FIG. 2 is a flow chart for explaining the operation of the control circuit 24 shown in FIG. 1.

FIG. 2 is a flow chart showing the operation of the control circuit 24 of this embodiment. The programs for performing the operation of the flow chart are stored in the ROM of the control circuit 24.

First, the control circuit 24 outputs a level "0" signal to NCU 2 to connect the telephone line 2a to the telephone set 4 (S32). The control circuit 24 also outputs a level "0" signal to the monitor circuit 22 to turn it off (S34).

The detection circuit 10 determines whether a 1300 Hz facsimile calling signal is detected (S36). If such a signal is detected, the telephone line 2a is connected to the facsimile side (S38) to perform a facsimile procedure (S40) and effect facsimile transmission (S56). If no such signal is detected, the detection circuit 8 determining whether a 16 Hz calling signal is detected on the telephone line (S42).

If a 16 Hz calling signal is detected, the telephone line 2a is connected to the facsimile side (S46). Conversely, if such a signal is not detected, a determination is made as to whether facsimile transmission have been selected, for example, by depressing a start button (S44). If such a selection has been made, selected, the telephone line 2a is connected to the facsimile side (S46) to turn on the monitor circuit 22 (S48), while otherwise, the flow returns to step S36.

After a facsimile procedure has been carried out (S50), a determination is made as to whether a significant signal (facsimile procedure signal) has been detected (S52). If such a signal has been detected, the monitor circuit 22 is turned off (S54), to perform facsimile transmission (S56), while otherwise the flow returns to step S50.

The above embodiment has been described for the case where the data communication apparatus is at a receiving side. The receiving operation may be done in an automatic reception mode in connection with a call made over a normal telephone line, in an automatic reception mode over a dedicated facsimile communication line, in a manual reception mode over a normal telephone line, or the like.

In the case of an automatic reception mode used in connection with a call over a normal telephone line, the receiving party may sometimes be using the telephone for speech communication (e.g., during a conversation by means of a public telephone). Therefore, first, the receiving side is monitored.

The monitor is turned off when a significant signal (a facsimile procedure signal, such as preamble, GC1, GC2, or PHS signal) is received from the receiving party. If the receiving party is using the telephone for speech communication, all the speech is monitored by the sending party's facsimile apparatus. This permits the operator at the sending party to recognize that the receiving party wishes to communicate over the telephone using speech. In this case, after receiving a significant signal from the receiving party, the monitor at the sending side is turned off and thereafter, facsimile transmission starts.

In a case where a sending or receiving operation is selected manually, e.g., by depressing a start button, in response to a call from a telephone line, first the monitor is turned on and kept in this state until a significant signal is detected, at which time the monitor is turned off.

The above turning-on/off operating enables the operator to speak with a counterpart even when the other operator has selected a sending or a receiving operation.

In a case of an automatic reception over a dedicated facsimile communication line, this reception is only for communication and the operator at the sending side never intervenes between communications, so that the monitor is not turned on.

The above embodiment has been described with respect to a facsimile apparatus. However, this invention is applicable as well to other communication apparatus, such as a word processor.

As mentioned above embodiment has been described for the case when the data communication apparatus is at a receiving side. A similar description is also applicable to the sending side. In particular, the monitor is not turned on during communication over a dedicated facsimile communication line. In other cases where an automatic sending mode is employed, or a sending or receiving operation is selected by depressing a start button or the like, the monitor is turned on and is kept in this state until a significant signal is detected from the receiving party, and at that time is turned off.

In the above embodiment, the monitor is turned off during use of a dedicated facsimile communication line, whereas the monitor is turned on during use of a normal telephone line. The invention however, is not limited to these specific arrangements. For example, the monitor is turned off for use with a digital network, whereas the monitor is turned on for use with an analog network. This results from the fact that a digital network need not to be monitored since voice and data are both processed in the form of digital information and an identification code is given to each body of information, so that the apparatus can identify its partner by itself.

As described so far, according to this embodiment of a data communication apparatus monitoring signals from the partner, audible noises from the monitor can substantially be reduced and unnecessary monitoring can be avoided.

The present invention is not limited to the above embodiment, but various modifications are possible within the scope of the appended claims.

I claim:

1. A data communication apparatus comprising:
means for performing data communication between said apparatus and another station;
informing means for outputting information contained in an answer signal received from the other station; and
means for controlling an operation of said informing means in accordance with a characteristic of a communication network used in the data communication,
wherein said control means disables said informing means when a network for exclusive use for data communication is used.

2. A data communication apparatus according to claim 1, wherein said control means enables said informing means when a communication network other than a network for exclusive use for data communication is used, and disables said informing means when a signal for a data communication is received from the other station.

3. A data communication apparatus according to claim 1, wherein said informing means is adapted to output audible sounds corresponding to signals from the other station.

4. An apparatus according to claim 1, wherein said informing means comprises a speaker and outputs the signal from the other station as sound, the sound constituting the output signal.

5. A facsimile apparatus comprising:
speech communication means for performing speech communication between said apparatus and another station;
data communication means for performing image data communication between said apparatus and the other station;
means for switching between said speech communication means and said data communication means;
informing means for outputting information contained in an answer signal received from the other station in an image data communication mode in which image data communication is performed by said data communication means; and
control means for controlling an operation of said information means in accordance with a characteristic of a communication network used in the image data communication,
wherein, unless the communication network used in the image data communication is one also used for speech communication, said control means disables said informing means.

6. An apparatus according to claim 5, wherein, if the communication network used in the image data communication is one also used for speech communication, said control means enables said informing means.

* * * * *

UNITED STATES PATENT AND TRADEMARK OFFICE
CERTIFICATE OF CORRECTION

PATENT NO. : 4,823,375
DATED : April 18, 1989
INVENTOR(S) : TAKEHIRO YOSHIDA          Page 1 of 2

It is certified that error appears in the above-identified patent and that said Letters Patent is hereby corrected as shown below:

AT [54] TITLE

Line 2, "CUPABLE" should read --CAPABLE--.

COLUMN 1

Line 3, "CUPABLE" should read --CAPABLE--.
    Line 21, "one" should read --on--.
    Line 49, "if used" should read --if such--.

COLUMN 2

Line 4, "conncts" should read --connects--.
    Line 6, "control circuit" should read
        --control circuit 24-- and
        "NCU 2" should read --NCU 2.--.
    Line 7, "24." should be deleted.
    Line 10, "hybrid circuit," should read
        --hybrid circuit 6,--.
    Line 33, "contrl circuit 24." should read
        --control circuit 24.--.

COLUMN 3

Line 23, "determining" should read --determines--.
    Line 29, "have" should read --has--.
    Line 31, "selected" should be deleted.

UNITED STATES PATENT AND TRADEMARK OFFICE
CERTIFICATE OF CORRECTION

PATENT NO. : 4,823,375
DATED : April 18, 1989
INVENTOR(S) : TAKEHIRO YOSHIDA

It is certified that error appears in the above-identified patent and that said Letters Patent is hereby corrected as shown below:

COLUMN 6

Line 9, "information means" should read
--informing means--.

Signed and Sealed this

Thirteenth Day of March, 1990

Attest:

JEFFREY M. SAMUELS

*Attesting Officer*     Acting Commissioner of Patents and Trademarks